(12) United States Patent
Kasuya et al.

(10) Patent No.: US 9,636,990 B2
(45) Date of Patent: May 2, 2017

(54) HYBRID DRIVE APPARATUS

(71) Applicant: AISIN AW CO., LTD., Anjo-shi, Aichi-ken (JP)

(72) Inventors: Satoru Kasuya, Nishio (JP); Masashi Kito, Anjo (JP); Yuichi Seki, Okazaki (JP); Muneyuki Tsumura, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 316 days.

(21) Appl. No.: 14/422,930

(22) PCT Filed: Sep. 27, 2013

(86) PCT No.: PCT/JP2013/076412
§ 371 (c)(1),
(2) Date: Feb. 20, 2015

(87) PCT Pub. No.: WO2014/051110
PCT Pub. Date: Apr. 3, 2014

(65) Prior Publication Data
US 2015/0239336 A1 Aug. 27, 2015

(30) Foreign Application Priority Data

Sep. 28, 2012 (JP) .................................. 2012-218395

(51) Int. Cl.
*B60K 6/54* (2007.10)
*B60K 6/405* (2007.10)
(Continued)

(52) U.S. Cl.
CPC ................ *B60K 6/54* (2013.01); *B60K 6/387* (2013.01); *B60K 6/405* (2013.01); *B60K 6/48* (2013.01);
(Continued)

(58) Field of Classification Search
CPC .. Y02T 10/70; Y02T 10/7077; B60L 2240/36; F16D 2300/0214; F16D 25/0638; F16D 2300/26
See application file for complete search history.

(56) References Cited

U.S. PATENT DOCUMENTS 4,830,164 A * 5/1989 Hays ................... F16D 69/0408
188/250 G
5,123,387 A 6/1992 Jones
(Continued)

FOREIGN PATENT DOCUMENTS

JP H05-280370 A 10/1993
JP 2004-276913 A 10/2004
(Continued)

OTHER PUBLICATIONS

Nov. 19, 2013 Search Report issued in International Application No. PCT/JP2013/076412.

*Primary Examiner* — Victor MacArthur
(74) *Attorney, Agent, or Firm* — Oliff PLC (57) ABSTRACT

A hybrid drive apparatus includes a rotary electric machine including a rotor capable of transmitting driving force to at least a speed change mechanism and a rotor hub that holds the rotor; a clutch; an oil hole that supplies oil from a radial inner side of the clutch toward the clutch; and a partition member disposed with a clearance provided in at least a portion in a circumferential direction between the rotor hub and the partition member on a radial inner side of the rotor hub.

10 Claims, 2 Drawing Sheets

(51) Int. Cl.
*B60K 6/48* (2007.10)
*B60L 11/14* (2006.01)
*F16D 25/12* (2006.01)
*B60L 3/00* (2006.01)
*B60K 6/387* (2007.10)
*H02K 7/108* (2006.01)
*H02K 9/19* (2006.01)
*F16D 25/0638* (2006.01)
*B60K 1/00* (2006.01)

(52) U.S. Cl.
CPC ............ *B60L 3/0061* (2013.01); *B60L 11/14* (2013.01); *F16D 25/12* (2013.01); *F16D 25/123* (2013.01); *H02K 7/108* (2013.01); *H02K 9/19* (2013.01); *B60K 2001/006* (2013.01); *B60L 2240/36* (2013.01); *B60Y 2400/4244* (2013.01); *F16D 25/0638* (2013.01); *F16D 2300/0214* (2013.01); *F16D 2300/26* (2013.01); *Y02T 10/6221* (2013.01); *Y02T 10/641* (2013.01); *Y02T 10/70* (2013.01); *Y02T 10/7077* (2013.01); *Y10T 74/19014* (2015.01)

(56) References Cited

U.S. PATENT DOCUMENTS

| | | | | |
|---|---|---|---|---|
| 2004/0214686 A1* | 10/2004 | Katou | ................... | F16D 25/10 477/98 |
| 2006/0276321 A1 | 12/2006 | Pitkamaki et al. | | |
| 2009/0283344 A1* | 11/2009 | Arnold | ................... | B60K 6/26 180/65.22 |
| 2010/0109461 A1* | 5/2010 | Kato | ................... | B60K 6/26 310/90 |
| 2011/0121692 A1* | 5/2011 | Iwase | ................... | B60K 6/40 310/67 R |
| 2011/0239818 A1* | 10/2011 | Kasuya | ................... | B60K 6/387 74/665 A |
| 2011/0240430 A1* | 10/2011 | Iwase | ................... | B60K 6/26 192/3.29 |
| 2011/0240431 A1* | 10/2011 | Iwase | ................... | B60K 6/26 192/3.29 |
| 2012/0032538 A1* | 2/2012 | Kasuya | ................... | B60K 6/48 310/54 |
| 2012/0032544 A1* | 2/2012 | Kasuya | ................... | B60K 1/00 310/90 |
| 2012/0080248 A1 | 4/2012 | Kasuya et al. | | |
| 2012/0080286 A1* | 4/2012 | Kasuya | ................... | B60K 6/40 192/113.3 |
| 2012/0090425 A1* | 4/2012 | Kasuya | ................... | B60K 6/387 74/661 |
| 2012/0217122 A1* | 8/2012 | Kasuya | ................... | B60K 6/387 192/113.35 |
| 2012/0217825 A1* | 8/2012 | Kasuya | ................... | H02K 11/21 310/54 |
| 2012/0242198 A1* | 9/2012 | Kasuya | ................... | H02K 7/083 310/68 B |

FOREIGN PATENT DOCUMENTS

| | | |
|---|---|---|
| JP | 2006-522679 A | 10/2006 |
| KR | 20100008470 A | 1/2010 |
| KR | 20100015063 A | 2/2010 |
| WO | 2012/039370 A1 | 3/2012 |
| WO | 2012/039378 A1 | 3/2012 |

* cited by examiner

HYBRID DRIVE APPARATUS

BACKGROUND

The present disclosure relates to a hybrid drive apparatus which is mounted on a vehicle and the like, and more particularly, relates to a hybrid drive apparatus including a clutch that drivingly connects an internal combustion engine and a speed change mechanism on a radial inner side of a rotary electric machine.

In recent years, development is underway on hybrid vehicles that combine a motor-generator (hereinafter simply called "motor") as a rotary electric machine with an internal combustion engine as a source of power. In a hybrid drive apparatus proposed as one form of hybrid drive apparatuses for use in such hybrid vehicles, a motor drivingly connected to an input shaft of a speed change mechanism and an engine connecting clutch that engages and disengages (engages or releases) the input shaft and an engine connection shaft drivingly connected to the internal combustion engine are disposed at a part of a starting device (for example, torque converter) of a general automatic transmission so that a parallel hybrid drive apparatus is formed by simple replacement (refer to Korean Patent Application Publication No. 10-2010-0008470).

In the engine connecting clutch according to Korean Patent Application Publication No. 10-2010-0008470, outer friction plates and inner friction plates structuring a clutch are cooled by oil flying from the input shaft (or the engine connecting shaft may be also used) toward a radial outer side. The clutch is disposed on a radial inner side of a motor to reduce the axial dimension of the apparatus. Oil that cooled the outer friction plates and the inner friction plates is discharged from a hole formed on a drum portion engaged with the outer friction plates through between the drum portion and a rotor hub that holds a rotor of the motor.

SUMMARY

In the case of the structure described in the above-described Korean Patent Application Publication No. 10-2010-0008470, oil with high temperature used for cooling the outer friction plates and the inner friction plates is guided up to the rotor hub that holds the rotor of the motor. Therefore, the temperature of the rotor hub and the rotor may rise. For example, when the rotor is structured with a magnet, demagnetization of the magnet occurs due to temperature increase, and the performance of the motor may be reduced.

Therefore, it is an object of the present disclosure to provide a hybrid drive apparatus including a clutch disposed on a radial inner side of the rotary electric machine, in which the temperature increase of the rotor hub and the rotor can be suppressed while the axial dimension of the apparatus is reduced.

A hybrid drive apparatus according to an exemplary embodiment includes a rotary electric machine including a rotor capable of transmitting driving force to at least a speed change mechanism and a rotor hub that holds the rotor; a clutch that includes an outer friction plate, an inner friction plate, and a drum portion engaged with the outer friction plate, that drivingly connects an internal combustion engine and the speed change mechanism through engagement or release between the outer friction plate and the inner friction plate, and that is disposed on a radial inner side of the rotary electric machine such that the clutch overlaps at least a part of the rotor as viewed in the radial direction; an oil hole that supplies oil from a radial inner side of the clutch toward the clutch; and a partition member disposed with a clearance provided in at least a portion in a circumferential direction between the rotor hub and the partition member on a radial inner side of the rotor hub.

The hybrid drive apparatus according to an exemplary embodiment, wherein the clearance between the rotor hub and the partition member is a dry space which oil does not reach.

The hybrid drive apparatus according to an exemplary embodiment, wherein the rotor includes laminated steel sheets and a magnet and is held by the rotor hub such that at least a part of the laminated steel sheets contact the rotor hub without a gap.

The hybrid drive apparatus according to an exemplary embodiment, wherein the drum portion includes a through hole that runs through the drum portion in the radial direction, and the partition member includes an annular portion in a cylindrical shape, which covers an outer periphery of the through hole of the drum portion, and a convex portion that is formed on multiple portions of an outer peripheral surface of the annular portion in the circumferential direction so as to project to a radial outer side and that is placed in contact with an inner peripheral surface of the rotor hub such that the clearance is formed between the partition member and the rotor hub.

The hybrid drive apparatus according to an exemplary embodiment, wherein the clearance occupies a larger proportion in the circumferential direction between the annular portion and the rotor hub than the convex portion.

The hybrid drive apparatus according to an exemplary embodiment, further includes a snap ring for positioning the partition member with regard to the rotor hub in the axial direction.

The hybrid drive apparatus according to an exemplary embodiment, wherein the partition member is formed of resin.

The hybrid drive apparatus according to an exemplary embodiment, wherein the outer friction plate and the inner friction plate in the clutch are brought into a slip engagement state when a vehicle is started by the internal combustion engine.

The hybrid drive apparatus according to an exemplary embodiment, wherein the rotor hub includes a rotor holding portion that holds the rotor, the rotor holding portion includes two wall members that each extend toward a radial inner side, the clutch is disposed in a space surrounded by the two wall members and the rotor holding portion, the partition member is formed of an annular portion extending in the axial direction and a circular portion in a plate shape extending from one end portion of the annular portion to a radial outer side, and the circular portion is held between the rotor holding portion and one of the two wall members with a snap ring on one side in the axial direction of the rotor holding portion so as to be fixed, and the other end portion of the annular portion is placed in contact with the other wall member, and one of the two wall members includes a hole on a radial outer side of the drum portion.

The hybrid drive apparatus according to an exemplary embodiment, wherein the rotor hub includes a rotor holding portion that holds the rotor, the rotor holding portion includes two wall members that each extend toward a radial inner side, the clutch is disposed in a space surrounded by the two wall members and the rotor holding portion, one of the two wall members is disposed on the speed change mechanism side, transmits power from the motor to the speed change mechanism, and includes a hole on a radial outer side of the drum portion, and the other wall member is disposed on the internal combustion engine side so as to support the rotor via the rotor holding portion.

According to an exemplary embodiment, the clutch is disposed on the radial inner side of the rotary electric machine such that the clutch overlaps at least a part of the rotor as viewed in the radial direction, whereby the axial dimension of the apparatus can be reduced. In addition, the partition member is disposed with a clearance provided in at least a portion in the circumferential direction between the partition member and the rotor hub on the radial inner side of the rotor hub, thereby suppressing the flow of oil in high temperature used for cooling the clutch to the rotor hub. Therefore, even in a structure where the clutch is disposed on the radial inner side of the rotary electric machine, the temperature increase in the rotor hub and the rotor can be suppressed.

According to an exemplary embodiment, oil does not reach the clearance formed between the partition member and the rotor hub, which forms a dry space. Therefore, thermal conduction from the partition member to the rotor hub is suppressed by airspace of the clearance, and the temperature increase of the rotor hub and the rotor can be further suppressed. In addition, oil in high temperature used for cooling the clutch does not flow into the clearance. Accordingly, the temperature increase of the rotor hub can be further suppressed.

According to an exemplary embodiment, because the partition member is provided so as to suppress the temperature increase of the rotor hub, the temperature increase of the magnet of the rotor can be also suppressed even in a structure where at least a part of the laminated steel sheets of the rotor contacts the rotor hub without a gap. Therefore, it is possible to suppress reduction of performance of the motor due to the temperature increase.

According to an exemplary embodiment, in a structure where the drum portion includes a through hole that runs through the drum portion in the radial direction, the partition member includes the annular portion in a cylindrical shape that covers the outer periphery of the through hole of the drum portion. Therefore, although oil used for cooling the clutch is discharged from the through hole, the partition member suppresses the flow of oil to the rotor hub. In addition, the convex portion provided on the outer peripheral surface of the annular portion is placed in contact with the inner peripheral surface of the rotor hub, whereby a clearance can be reliably formed between the partition member and the rotor hub in a simple structure.

According to an exemplary embodiment, the clearance occupies a larger proportion in the circumferential direction between the annular portion and the rotor hub than the convex portion, whereby thermal conduction from the partition member to the rotor hub can be suppressed.

According to an exemplary embodiment, the snap ring is provided, whereby the positioning of the partition member in the axial direction can be reliably achieved in a simple structure.

According to an exemplary embodiment, because the partition member is formed of resin with comparatively low thermal conductivity, thermal conduction to the rotor hub is suppressed. Therefore, the temperature increase of the rotor hub and the rotor can be further suppressed.

According to an exemplary embodiment, the flow of lubricating oil used for cooling the clutch in higher temperature due to the slip engagement to the rotor hub can be suppressed. Therefore, the temperature increase of the rotor hub and the rotor can be more effectively suppressed.

According to an exemplary embodiment, oil supplied from the radial inner side of the clutch toward the space surrounded by the two wall members and the rotor holding portion cools the clutch, reaches the partition member, and is discharged from the hole formed in one of the wall members. Therefore, the temperature increase of the rotor hub and the rotor can be further suppressed while the cooling performance for the clutch is ensured.

According to an exemplary embodiment, the hole is formed in one of the wall members that does not support the rotor. Therefore, even when oil that cools the clutch is discharged from the hole, the oil may not reach the rotor holding portion, and the temperature increase of the rotor hub and the rotor can be further suppressed. In addition, when the clutch is disposed in a space surrounded by the wall member that is disposed on the speed change mechanism side and transmits power from the motor to the speed change mechanism and the wall member that is disposed on the internal combustion engine side and supports the rotor through the rotor holding portion, oil can be discharged from the hole formed in one of the wall members on the radial outer side of the drum portion. This suppresses the buildup of oil in high temperature used for cooling the clutch and heat inside the rotor holding portion.

DETAILED DESCRIPTION OF THE EMBODIMENTS

A hybrid drive apparatus 1 according to an exemplary embodiment will be described below based on FIGS. 1 and 2. This hybrid drive apparatus 1 according to the present embodiment is preferably mounted on a front-engine front-drive (FF) vehicle. The right-left direction in drawings corresponds to the right-left direction in the actual vehicle-mounted state. However, for convenience of description, the side of a driving source such as an engine is called the "front side", and the side opposite from the driving source is called the "rear side". The term "drivingly connected" refers to a state in which rotational elements are connected to each other so as to be capable of transmitting a driving force therebetween, and is used as a concept including a state in which the rotational elements are connected so as to rotate as a unit, or a state in which the rotational elements are connected so as to be capable of transmitting the driving force via, for example, a clutch.

[Outline Structure of Hybrid Drive Apparatus]

Figure 1:
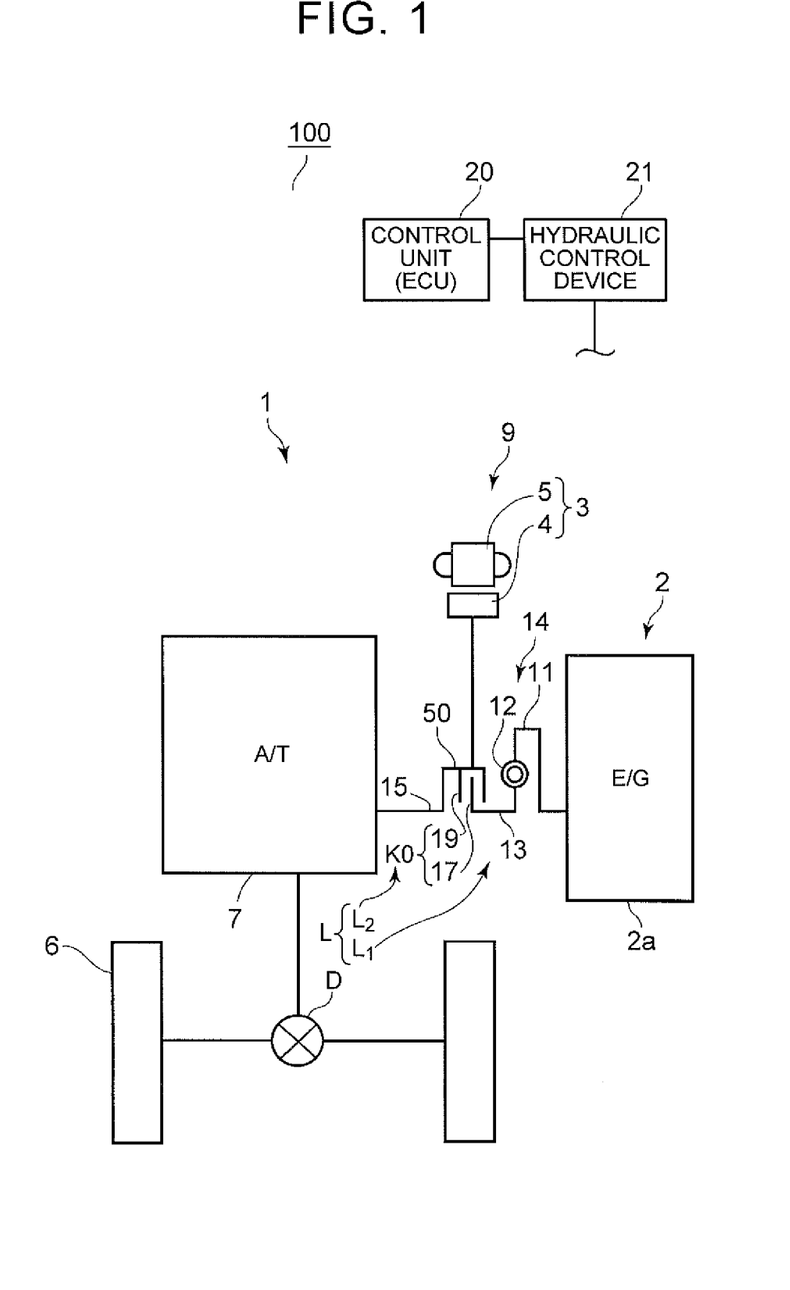
FIG. 1 is a schematic diagram showing a hybrid automobile to which the present exemplary embodiment can be applied.
Figure 2:
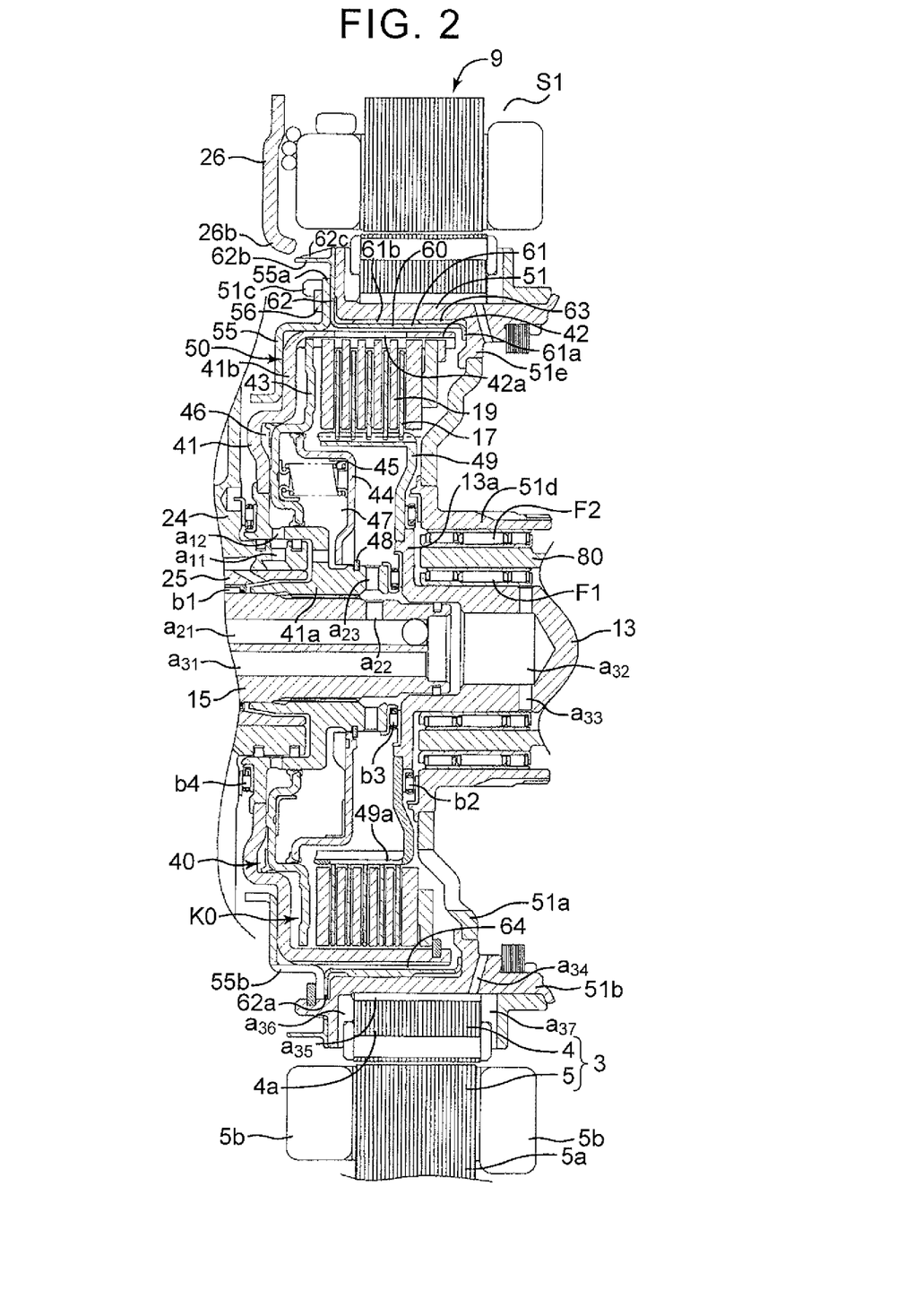
FIG. 2 is a sectional view showing a structure of a clutch and its surroundings of a hybrid drive apparatus according to an exemplary embodiment.

As shown in FIG. 1, a hybrid vehicle 100 (hereinafter simply called "vehicle") includes, in addition to an internal combustion engine 2, a motor-generator (hereinafter simply called "motor") 3 as a rotary electric machine, as a driving source. The hybrid drive apparatus 1 structuring a power train of the vehicle 100 is structured so as to include a speed change mechanism 7 provided on a transmission path L of power between a wheel 6 and the internal combustion engine 2, an input portion 9 disposed between the speed change mechanism 7 and the internal combustion engine 2 and into which power from the internal combustion engine 2 is input, and a connecting portion 14 that connects the input portion 9 and the internal combustion engine 2 while absorbing pulsations from the internal combustion engine 2.

The above described connecting portion 14 includes a damper 12 connected to a crankshaft 2a of the internal combustion engine 2 via a drive plate 11. The damper 12 is connected to an engine connection shaft (engine connection shaft member) 13 that is an input member serving as the input portion 9. That is, the engine connection shaft 13 is drivingly connected to the internal combustion engine 2 via the damper 12.

The input portion 9 is structured so as to include a clutch (engine connecting clutch) K0 that connects and disconnects power transmission between the engine connection shaft 13 and an input shaft 15 of the speed change mechanism 7, and a motor 3 drivingly connected to a clutch drum 50. The motor 3 is structured so as to include a rotor 4 connected to the clutch drum 50, and a stator 5 disposed on a radial outer side of the rotor 4 so as to face the rotor 4. The motor 3 is capable of transmitting driving force to at least the speed change mechanism 7.

The clutch K0 is structured by a multi-plate clutch including a plurality of outer friction plates 19, a plurality of inner friction plates 17, a clutch drum 50 engaged with the outer friction plates 19, and a clutch hub 49 engaged with the inner friction plates 17. The clutch drum 50 is connected to the input shaft (input shaft member) 15 of the speed change mechanism 7 so as to rotate together with the input shaft 15, and the clutch hub 49 is connected to the engine connection shaft 13 so as to rotate together with the engine connection shaft 13. In other words, the clutch K0 includes the inner friction plates 17 drivingly connected to a transmission path $L_1$ on the internal combustion engine side of the transmission path L and the outer friction plates 19 drivingly connected to a transmission path $L_2$ on a wheel side of the transmission path L. Therefore, the clutch K0 drivingly connects the internal combustion engine 2 and the speed change mechanism 7 through engagement or disengagement between the outer friction plates 19 and the inner friction plates 17.

The speed change mechanism 7 is formed of a speed change mechanism capable of achieving six forward speeds and a reverse speed by changing the transmission path based on the engagement state of a plurality of friction engagement elements (clutches and brakes), for example. An output member of the speed change mechanism 7 is connected to a driving wheel 6 through a differential device D. The speed change mechanism 7 may be a stepped speed change mechanism that achieves, for example, three to five forward speeds, or seven or more forward speeds, or may be a continuously variable speed change mechanism such as a belt-type continuously variable speed change mechanism, a toroidal-type continuously variable speed change mechanism, and a ring-corn type continuously variable speed change mechanism. That is, the present exemplary embodiment can be applied to any speed change mechanism.

As described above, the hybrid drive apparatus 1 includes the connecting portion 14, the input portion 9 including the clutch K0 and the motor 3, and the speed change mechanism 7 sequentially from the internal combustion engine 2 side toward the wheel 6 side. When both the internal combustion engine 2 and the motor 3 are driven to run a vehicle, the clutch K0 is engaged by a control unit (ECU) 20 to control the hydraulic control device 21. During an EV mode of driving with only a driving force of the motor 3 drivingly connected to the transmission path $L_2$ on the wheel side, the clutch K0 is released to disconnect the transmission path $L_1$ on the internal combustion engine 2 side from the transmission path $L_2$ on the wheel 6 side. In addition, in the clutch K0, when the vehicle is started by the internal combustion engine 2, the outer friction plates 19 and the inner friction plates 17 are brought into the slip engagement state. Particularly, while the vehicle creeps, the outer friction plates 19 and the inner friction plates 17 are in the slip engagement state for a long period of time.

[Configuration of Input Portion]

Next, the configuration of the input portion 9 will be described based on FIG. 2. As shown in FIG. 2, a clutch K0 and a motor 3 are accommodated inside a housing case 26 fixed to a transmission case that accommodates the speed change mechanism 7, and an internal space S1 inside the housing case 26 that accommodates the clutch K0 and the motor 3 is separated from the connecting portion 14 by a partition integrally attached to the housing case 26 so as to form a closed space.

The engine connection shaft 13 connected to the internal combustion engine 2 via the damper 12 of the connecting portion 14 and the input shaft 15 of the speed change mechanism 7 are disposed on the center side of the housing case 26 so as to be coaxial with each other. The engine connection shaft 13 is rotatably supported in relation to the partition. The input shaft 15 is rotatably supported by a needle bearing b1 via a sleeve member 25 in relation to a partition 24 fixed to the transmission case.

A flange portion 13a is formed on a rear end part of the engine connection shaft 13, which is on the speed change mechanism 7 side. A clutch hub 49 in spline engagement with the plurality of inner friction plates 17 of the clutch K0 is bonded to the flange portion 13a. That is, the inner friction plates 17 are drivingly connected to the engine connection shaft 13.

The clutch K0 is generally structured so as to include the plurality of inner friction plates 17, the outer friction plates 19 disposed alternately with the inner friction plates 17, a clutch drum 50 in spline engagement with the outer friction plates 19, the clutch hub 49, and a hydraulic servo 40 that engages and disengages (engages or releases) the inner friction plates 17 and the outer friction plates 19. The outer friction plates 19 and the inner friction plates 17 are positioned so as to at least partially overlap the rotor 4 of the motor 3 when viewed from the radial direction. The clutch drum 50 includes a cylinder portion 41 drivingly connected to the input shaft 15 and a drum portion 42 formed on an outer peripheral side of a flange portion 41b of the cylinder portion 41 in spline engagement with the plurality of outer friction plates 19 on its inner side. That is, the clutch drum 50 is integrally structured with the cylinder portion 41 and the drum portion 42. The outer friction plates 19 are drivingly connected to the input shaft 15 via the drum portion 42 and the cylinder portion 41. Note that the cylinder portion 41 includes a boss portion 41a disposed between a flange portion 13a of the engine connection shaft 13 and the partition 24. The boss portion 41a is rotatably positioned in the axial direction by thrust bearings b3 and b4.

The hydraulic servo 40 includes the cylinder portion 41 structuring the hydraulic cylinder, a piston 43 disposed so as to be movable in relation to the cylinder portion 41 in the axial direction and such that its distal end portion faces the outer friction plates 19 (or inner friction plates 17), and a return plate 44 positioned by a snap ring 48 in relation to the boss portion 41a of the cylinder portion 41, and a return spring 45 provided compressed between the piston 43 and the return plate 44. The hydraulic servo 40 also includes a hydraulic oil chamber 46 formed between the cylinder portion 41 and the piston 43, and a cancel oil chamber 47 formed so as to cancel centrifugal oil pressure between the piston 43 and the return plate 44.

Meanwhile, a ring-shaped stator 5 of the motor 3 is fixed on an inner peripheral side of the housing case 26, which is an outer peripheral side of the clutch K0. The stator 5 is structured so as to include a stator core 5a and coil ends 5b, 5b which include folding portions of a coil wound around the stator core 5a and protrude to both sides of the stator core 5a in the axial direction. A ring-shaped rotor 4 of the motor 3 is disposed on the inner peripheral side of the stator core 5a so as to face the stator core 5a with a predetermined space apart from each other.

A rotor hub 51 is fixed to the drum portion 42 via a connecting member 55 (one of wall members) formed in a crank shape so as to hold the rotor 4. The connecting member 55 is structured such that a radial inner side portion thereof is fixed to the flange portion 41b of the cylinder portion 41 by welding and a radial outer side portion is a comb portion 55a formed in a comb shape. The comb portion 55a includes a plurality of notches (holes) 55b formed in the circumferential direction, which passes through in the axial direction. The plurality of notches 55b is formed from a radial outer end part of the connecting member 55 to a portion adjacent to a space in which a partition member 60 described later is disposed between the drum portion 42 and the rotor hub 51. That is, the notches 55b are formed on the radial outer side of the drum portion 42.

A plurality of protrusions 51c is formed on a portion of the rotor hub 51 that faces the comb portion 55a so as to engage with a corresponding one of the plurality of notches 55b of the comb portion 55a. In a state where the notches 55b of the connecting member 55 and the protrusions 51c are engaged with each other, a snap ring 56 is fitted into the notch formed on an inner peripheral side of the protrusions 51c to achieve positioning of the connecting member 55 and the drum portion 42 in relation to the rotor hub 51 in the axial direction and to drivingly connect the connecting member 55, the drum portion 42, and the rotor hub 51. Accordingly, the motor 3 is drivingly connected to the input shaft 15 via the rotor hub 51, the connecting member 55, and the cylinder portion 41.

The rotor hub 51 that holds the rotor 4 is structured so as to include a holding portion (rotor holding portion) 51b in a drum shape which crimps and holds a rotor core 4a of the rotor 4, a supporting portion (the other wall member) 51a in a flange shape that supports the holding portion 51b, and a sleeve portion 51d in a sleeve shape connected to an inner peripheral side of the supporting portion 51a. The holding portion 51b and the supporting portion 51a, and the supporting portion 51a and the sleeve portion 51d are each welded to form the integrated rotor hub 51. The supporting portion 51a and the connecting member 55, both of which are wall members, are each provided on the holding portion 51b (rotor holding portion) so as to extend to a radial inner side. The drum portion 42, the outer friction plates 19 and the inner friction plates 17 are disposed in a space surrounded by the supporting portion 51a, the connecting member 55, and the holding portion 51b. Here, the connecting member 55, which is one of the wall members, is disposed on the speed change mechanism 7 side. By being connected to the rotor hub 51 as described above, the connecting member 55 transmits power of the motor 3 to the speed change mechanism 7. In addition, the supporting portion 51a, which is the other wall member, and a connecting portion 51e described later are disposed on the internal combustion engine 2 side, and supports the rotor 4 via the holding portion 51b. The sleeve portion 51d is rotatably supported in relation to the partition integrally attached to the housing case 26, and is also supported in the axial direction by a thrust bearing b2 provided between the sleeve portion 51d and the clutch hub 49 welded to a flange portion 13a of the engine connection shaft 13. A thrust bearing b3 is provided between the flange portion 13a of the engine connection shaft 13 and a boss portion 41a of the cylinder portion 41 such that the engine connection shaft 13 and the cylinder portion 41 are positioned and supported in the axial direction.

A pump driving shaft 80 drivingly connected to an oil pump (not shown) is disposed between the engine connection shaft 13 and the sleeve portion 51d of the rotor hub 51. The pump driving shaft 80 is disposed so as to be capable of connecting either one of the engine connection shaft 13 (engine 2) or the rotor hub 51 (motor 3), which has a higher rotational speed, via a first one-way clutch F1 or a second one-way clutch F2.

That is, the first one-way clutch F1 is disposed between the pump driving shaft 80 and the engine connection shaft 13, and the second one-way clutch F2 is disposed between the pump driving shaft 80 and the rotor hub 51. The first one-way clutch F1 is not engaged when the rotational speed of the engine connection shaft 13 (that is, internal combustion engine 2) is lower than the rotational speed of the pump driving shaft 80. The first one-way clutch F1 is engaged when the rotational speed of the pump driving shaft 80 is the same as the rotational speed of the engine connection shaft 13, and the oil pump is drivingly connected to the internal combustion engine 2 so as to be driven by a driving force of the internal combustion engine 2. Meanwhile, the second one-way clutch F2 is not engaged when the rotational speed of the rotor hub 51 (that is, motor 3) is lower than the rotational speed of the pump driving shaft 80. The second one-way clutch F2 is engaged when the rotational speed of the pump driving shaft 80 is the same as the rotational speed of the rotor hub 51, and the oil pump is drivingly connected to the motor 3 so as to be driven by a driving force of the motor 3.

That is, the oil pump is disposed so as to be drivingly connected to the transmission path $L_1$ on the internal combustion engine 2 side of the clutch K0, and is disposed so as to be drivingly connected to the transmission path $L_2$ on the speed change mechanism 7 side of the clutch K0 (see FIG. 1). In addition, when the clutch K0 is engaged, the transmission path $L_1$ and the transmission path $L_2$ are drivingly connected, whereby the rotational speed of the internal combustion engine 2 becomes identical to the rotational speed of the motor 3, and the oil pump is driven by the rotation.

The oil pump drivingly connected to the engine connection shaft 13 via the first one-way clutch F1 or to the rotor hub 51 via the second one-way clutch F2 is driven by a driving force of the motor 3 in an EV mode. The oil pump is driven by an inertial force of a vehicle via the speed change mechanism 7 during coasting (engine braking). The oil pump is driven by the motor 3 and the internal combustion engine 2 in a hybrid mode. The oil pump is driven by an inertial force of a vehicle via the speed change mechanism 7 during coasting (engine braking).

When starting the vehicle from its stopped state with the driving force of the internal combustion engine 2 while slip-engaging the clutch K0, the first one-way clutch F1 is engaged before engagement of the clutch K0 (that is, during a vehicle stop). Therefore, the oil pump is driven by the driving force of the internal combustion engine 2. When the oil pump is thus driven, hydraulic pressure is generated even during a vehicle stop and is supplied to the hydraulic control device 21 through an oil passage or the like formed in the partition. Note that an electric oil pump (not shown) supplies the hydraulic pressure necessary for the hydraulic control device 21 during a normal vehicle stop (particularly in the case where charging is not necessary, etc.).

Therefore, when the vehicle is started by a driving force of the internal combustion engine 2, the hydraulic pressure from the oil pump driven as described above is applied as well as the hydraulic pressure from the electric oil pump (not shown) described above. Accordingly, the lubrication pressure for supplying lubricating oil in large amount necessary for the slip engagement state when the vehicle is started can be generated not only from the electric oil pump but also from the above-described oil pump.

Next, various oil passage structures in the input portion 9 will be described. As shown in FIG. 2, the engagement pressure of the clutch K0 to be supplied from the hydraulic control device 21 to the partition 24 based on the command from the control unit 20 is supplied to the hydraulic oil chamber 46 of the hydraulic servo 40 via an oil passage a12 of the cylinder portion 41 of the clutch drum after passing through an oil passage a11 of the partition 24. When the engagement pressure is supplied to the hydraulic oil chamber 46, a piston 43 moves to an axial front side against the biasing force of a return spring 45, causing the inner friction plates 17 to be engaged with the outer friction plates 19. Thus, the internal combustion engine 2 and the speed change mechanism 7 are drivingly connected, and the vehicle 100 is brought into a hybrid mode that achieves travel using the driving force of the internal combustion engine 2 and the motor 3.

On the contrary, when the engagement pressure is discharged (drained) from the hydraulic oil chamber 46 by the hydraulic control device 21 based on the command from the control unit 20, the piston 43 move to an axial rear side against the biasing force of the return spring 45, causing the inner friction plates 17 to be disengaged from the outer friction plates 19. Accordingly, the internal combustion engine 2 and the speed change mechanism 7 are disconnected from each other, and the vehicle 100 is brought into an EV mode that achieves travel using the driving force of the motor 3 only.

Meanwhile, for a portion not shown in the drawing, lubricating oil for lubricating the clutch K0 is supplied to an oil passage a21 formed in the input shaft 15 extending in the axial direction via the sleeve member 25 from the partition 24. In the input shaft 15, an end portion of the oil passage a11 at the engine 2 side is closed. The oil passage a21 is in communication with an oil hole a23 of the cylinder portion 41 via an oil passage a22 formed so as to run through the input shaft 15 in the radial direction. Therefore, lubricating oil flying from the oil passage a22 is guided to a radial inner side of the clutch hub 49 via the oil hole 23a. That is, oil is supplied from the radial inner side of the clutch K0 to the clutch K0 via the oil hole a23.

The clutch hub 49 includes a through hole 49a that runs through the clutch hub 49 in the radial direction. The drum portion 42 of the clutch drum of the clutch K0 is opened to the engine 2 side in the axial direction. The drum portion 42 includes a through hole 42a that runs through the drum portion 42 in the radial direction at a position where the through hole 42a at least partially overlaps the outer friction plates 19 when viewed from the radial direction. Therefore, the lubricating oil guided to the radial inner side of the clutch hub 49 is guided to the inner friction plates 17 and the outer friction plates 19 through the through hole 49a of the clutch hub 49. Then, the lubricating oil that flows from the through hole 49a of the clutch hub 49 performs lubrication and cooling while passing through between the inner friction plates 17 and the outer friction plates 19, is discharged from the through hole 42a of the drum portion 42 toward a radial outer side, and runs on along an inner wall of a partition member 60 and a housing case 26 described later and is collected to an oil pan (not shown).

That is, the clutch K0 is opened to air with regard to the housing case 26 without the inner friction plates 17 and the outer friction plates 19 being oil-tight (not oil-tight). Thus, the clutch K0 is a wet multi-plate clutch in which the inner friction plates 17 and the outer friction plates 19 are disposed so as to be exposed to air. Note that a wall-shaped portion 26b that surrounds a coil end 5b described later is included in the housing case 26 so as to prevent the coil end 5b from being exposed to the lubricating oil used for cooling the clutch K0.

Meanwhile, for a portion not shown in the drawing, lubricating oil for lubricating the motor 3 is supplied to an oil passage a31 formed in the input shaft 15 in parallel with the oil passage a21 in the axial direction via the sleeve member 25 from the partition 24. In the input shaft 15, an end portion of the oil passage a31 on the engine 2 side is opened. The lubricating oil is discharged to an inner peripheral side of the pump driving shaft 80 via an oil passage a32 of the engine connection shaft 13 and an oil passage a33 formed so as to run through the input shaft 15 in the radial direction. The lubricating oil discharged from the oil passage a33 is guided to the inner side of the rotor hub 51. The lubricating oil guided to the inner side of the rotor hub 51 passes through an oil passage a34 formed in the rotor hub 51, and is axially allocated by an oil passage a35 so as to be supplied to the coil ends 5b, 5b from oil passages a36, a37, respectively, whereby the motor 3 is cooled.

According to the present embodiment, the partition member 60 that separates the rotor hub 51 from the drum portion 42 is disposed such that the rotor hub 51 that holds the rotor 4 of the motor 3 is not exposed to the lubricating oil used for cooling the inner friction plates 17 and the outer friction plates 19 as described above and discharged toward a radial outer side through the through hole 42a formed in the drum portion 42. The partition member 60 is formed of an annular portion 61 in a cylindrical shape extending in the axial direction and a circular portion 62 in a plate shape bent from one end portion of the annular portion 61 toward a radial outer side (extending toward a radial outer side), and is formed of resin with low thermal conductivity. The annular portion 61 of the partition member 60 is disposed with a clearance 63 provided in at least a portion in the circumferential direction between the annular portion 61 and the rotor hub 51 in the radial inner side of the rotor hub 51. The circular portion 62 is fixed to the rotor hub 51 via the connecting member 55 and the snap ring 56 that connect the rotor hub 51 and the cylinder portion 41 on one side in the axial direction of the holding portion 51b.

That is, the circular portion 62 of the partition member 60 includes a plurality of insertion holes 62a into which a plurality of protrusions 51c provided in the rotor hub 51 can be inserted. Then, the circular portion 62 is placed in contact with the rotor hub 51 in the state where the plurality of protrusions 51c is inserted into the plurality of insertion holes 62a of the circular portion 62. Further, the connecting member 55 is placed in contact with the circular portion 62 while the comb portion 55a thereof is engaged with the plurality of protrusions 51c, and the circular portion 62 is held between the connecting member 55 and the rotor hub 51. In this state, by fitting the snap ring 56 into the notch formed on the inner peripheral side of the plurality of protrusions 51c, the circular portion 62 is held between the snap ring 56 and the rotor hub 51 via the connecting member 55 so as to be fixed, and positioned in the axial direction with regard to the rotor hub 51 of the partition member 60.

A bending portion 61a bent in the radial inner direction is formed on the other end portion of the annular portion 61 of the partition member 60. The bending portion 61a is formed on the radial inner side of the rotor hub 51, and is placed in contact with a side surface of the connecting portion 51e (the other wall member) connected to the supporting portion 51a in the state where the partition member 60 is fixed to the rotor hub 51 as described above. Accordingly, the partition member 60 is sandwiched between the connecting portion 51e and the snap ring 56, and more precise positioning in the axial direction is achieved. In addition, the partition member 60 suppresses the flow of the lubricating oil that reaches the partition member 60 to the outside of the partition member 60 from the connecting portion 51e side. As a result, the annular portion 61 of the partition member 60 covers at least an outer side of the through hole 42a of the drum portion 42, and the space between the circumferential surface of the rotor hub 51 and the circumferential surface of the drum portion 42 that face with each other is separated.

A rim portion 62b is formed on a radial outer side of the circular portion 62 so as to be reinforced by a rib 62c and project in the axial direction. The rim portion 62b covers a radial inner side of the coil end 5b of the stator 5. The rim portion 62b and a wall-shaped portion 26b formed in the above-described housing case 26 prevent the coil end 5b from being exposed to the lubricating oil used for cooling the clutch K0.

Further, the partition member 60 includes a convex portion 61b formed on multiple portions of the outer peripheral surface of the annular portion 61 in the circumferential direction so as to project to a radial outer side. For the plurality of convex portions 61b, for example, three or more convex portions are formed at regular intervals on the annular portion 61 in the circumferential direction. Because the plurality of convex portions 61b are placed in contact with the inner peripheral surface of the rotor hub 51 structuring the motor 3, the above-described clearance 63 is formed between the annular portion 61 of the partition member 60 and the rotor hub 51. According to the present embodiment, the clearance 63 occupies a larger proportion in the circumferential direction between the annular portion 61 and the rotor hub 51 than the convex portion 61b. In addition, the annular portion 61 of the partition member 60 is disposed with a clearance 64 provided between the drum portion 42 and the annular portion 61.

As described above, the lubricating oil used for cooling the inner friction plates 17 and the outer friction plates 19 and discharged toward a radial outer side through the through hole 42a formed in the drum portion 42 reaches the partition member 60. Then, the lubricating oil is discharged from the plurality of notches 55b of the connecting member 55 through the clearance 64. The lubricating oil discharged from the plurality of notches 55b runs on the rim portion 62b, the wall-shaped portion 26b, and the inner wall of the housing case 26, and is collected to the oil pan (not shown). Therefore, oil does not reach the clearance 63 between the annular portion 61 of the partition member 60 and the rotor hub 51, which forms a dry space.

According to the present embodiment, as described above, the clutch K0 is disposed on the radial inner side of the motor 3, whereby the axial dimension of the apparatus can be reduced. In addition, because the through hole 42a is formed in the drum portion 42, the lubricating oil supplied to the outer friction plates 19 and the inner friction plates 17 is discharged from the through hole 42a. Accordingly, the outer friction plates 19 and the inner friction plates 17 can be efficiently cooled.

As described above, the lubricating oil in high temperature after being used for cooling the outer friction plates 19 and the inner friction plates 17 is discharged from the through hole 42a of the drum portion 42. According to the present embodiment, the partition member 60 is provided so as to separate the space between the rotor hub 51 of the motor 3 and the drum portion 42, thereby suppressing the flow of the lubricating oil in high temperature to the rotor hub 51. Accordingly, even in a structure where the clutch K0 is disposed on the radial inner side of the motor 3, and oil used for cooling the outer friction plates 19 and the inner friction plates 17 (clutch K0) is discharged from the through hole 42a of the drum portion 42, the temperature increase of the rotor hub 51 and the rotor 4 can be suppressed.

Particularly, in the case where the rotor 4 structuring the motor 3 is made of a magnet, demagnetization of the magnet occurs due to temperature increase, and the performance of the motor 3 may be reduced. According to the present embodiment, the partition member 60 is disposed on the radial inner side of the rotor hub 51 that supports the rotor 4, whereby the temperature increase of the rotor hub 51 and the rotor 4 is reduced. Accordingly, it is possible to suppress reduction of performance of the motor 3 due to the temperature increase of the rotor 4. That is, the rotor 4 includes laminated steel sheets and a magnet and is held by the rotor hub 51 such that at least a part of the laminated steel sheets contacts the rotor hub 51 without a gap. Therefore, when the temperature of the rotor hub 51 is increased, the temperature of the magnet is also increased via the laminated steel sheets that contact the rotor hub 51 without a gap, whereby the performance of the motor 3 is reduced. On the contrary, according to the present embodiment, because the partition member 60 is provided so as to suppress the temperature increase of the rotor hub 51 as described above, the temperature increase of the magnet of the rotor 4 can be also suppressed. Therefore, it is possible to suppress reduction of performance of the motor 3 due to the temperature increase. Note that, in the present embodiment, the oil passage a35 is formed in the rotor hub 51, and the laminated steel sheets of the rotor 4 do not contact the rotor hub 51 at a portion where the oil passage a35 is formed. Therefore, the outer peripheral surface of the rotor hub 51 contacts without a gap the portion of the inner peripheral surface of the laminated steel sheets, which does not face the oil passage a35.

According to the present embodiment, because the clearance 63 is provided between the partition member 60 and the rotor hub 51, thermal conduction from the partition member 60 to the rotor hub 51 is suppressed by airspace of the clearance 63. In addition, the clearance 63 is a dry space, and oil in high temperature used for cooling the clutch K0 does not flow into the clearance 63. Therefore, the temperature increase of the rotor hub 51 can be suppressed. Further, because the partition member 60 is formed of resin with comparatively low thermal conductivity, thermal conduction to the rotor hub 51 can be suppressed.

According to the present embodiment, the convex portion 61b provided on the outer peripheral surface of the partition member 60 is placed in contact with the inner peripheral surface of the rotor hub 51 of the motor 3. Therefore, the positioning of the partition member 60 and the rotor hub 51 in the radial direction can be reliably achieved in a simple structure, and the clearance 63 between the partition member 60 and the rotor hub 51 can be formed in a simple manner. By fitting the protrusions 51c provided in the rotor hub 51 into the insertion holes 62a provided in the circular portion 62 of the partition member 60 without a gap, the clearance 63 can be formed without providing the convex portion 61b described above.

The positioning of the partition member 60 in the axial direction is achieved by the snap ring 56, whereby the positioning of the partition member 60 in the axial direction can be reliably achieved in a simple structure. Here, the partition member 60 may be fixed to the rotor hub 51 by welding. However, if welding is performed, distortion may occur in the rotor hub 51, and an air gap between the rotor 4 and the stator 5 may be changed. The air gap is strictly controlled to enhance the performance of the motor 3. Therefore, it is not preferable that the change of the air gap occurs as described above. On the contrary, according to the present embodiment, the partition member 60 can be fixed using the snap ring 56 without causing distortion to the rotor hub 51, whereby the performance of the motor 3 is not reduced.

In addition, according to the present embodiment, in the clutch K0 disposed on the radial inner side of the motor 3, the outer friction plates 19 and the inner friction plates 17 are brought into the slip engagement state when the vehicle is started by the internal combustion engine 2. Particularly, while the vehicle creeps, the clutch may be in the slip engagement state for a long period of time. Therefore, the temperature of the lubricating oil used for cooling the outer friction plates and the inner friction plates in higher temperature because of the slip engagement further increases. According to the present embodiment, however, the partition member 60 provided as described above suppresses the flow of the lubricating oil in higher temperature to the rotor hub 51. Therefore, the temperature increase of the motor 3 can be effectively suppressed.

In the above description, the drum portion 42 engaged with the outer friction plates 19 is drivingly connected to the motor 3, and the clutch hub 49 engaged with the inner friction plates 17 is drivingly connected to the internal combustion engine 2. However, the exemplary embodiment may be applied to a structure in which the drum portion 42 engaged with the outer friction plates 19 is drivingly connected to the internal combustion engine 2 and the clutch hub 49 engaged with the inner friction plates 17 is drivingly connected to the motor 3.

The configuration for fixing the partition member 60 to the rotor hub 51 is not limited to that described above, and for example, another configuration using other fastening means such as bolts may be used.

The hybrid drive apparatus according to the exemplary embodiment may be used for drive apparatuses of various transport devices such as automobiles, industrial devices, and production machinery.

The invention claimed is:

1. A hybrid drive apparatus comprising:
a rotary electric machine including a rotor capable of transmitting driving force to at least a speed change mechanism and a rotor hub that holds the rotor;
a clutch that includes an outer friction plate, an inner friction plate, and a drum portion engaged with the outer friction plate, that drivingly connects an internal combustion engine and the speed change mechanism through engagement or release between the outer friction plate and the inner friction plate, and that is disposed on a radial inner side of the rotary electric machine such that the clutch overlaps at least a part of the rotor as viewed in the radial direction;
an oil hole that supplies oil from a radial inner side of the clutch toward the clutch; and
a partition member disposed with a clearance provided in at least a portion in a circumferential direction between the rotor hub and the partition member on a radial inner side of the rotor hub.

2. The hybrid drive apparatus according to claim 1, wherein
the clearance between the rotor hub and the partition member is a dry space which oil does not reach.

3. The hybrid drive apparatus according to claim 1, wherein
the rotor includes laminated steel sheets and a magnet and is held by the rotor hub such that at least a part of the laminated steel sheets contact the rotor hub without a gap.

4. The hybrid drive apparatus according to claim 1, wherein
the drum portion includes a through hole that runs through the drum portion in the radial direction, and
the partition member includes an annular portion in a cylindrical shape, which covers an outer periphery of the through hole of the drum portion, and a convex portion that is formed on multiple portions of an outer peripheral surface of the annular portion in the circumferential direction so as to project to a radial outer side and that is placed in contact with an inner peripheral surface of the rotor hub such that the clearance is formed between the partition member and the rotor hub.

5. The hybrid drive apparatus according to claim 4, wherein
the clearance occupies a larger proportion in the circumferential direction between the annular portion and the rotor hub than the convex portion.

6. The hybrid drive apparatus according to claim 1, further comprising:
a snap ring for positioning the partition member with regard to the rotor hub in the axial direction.

7. The hybrid drive apparatus according to claim 1, wherein
the partition member is formed of resin.

8. The hybrid drive apparatus according to claim 1, wherein
the outer friction plate and the inner friction plate in the clutch are brought into a slip engagement state when a vehicle is started by the internal combustion engine.

9. The hybrid drive apparatus according to claim 1, wherein
the rotor hub includes a rotor holding portion that holds the rotor,
the rotor holding portion includes two wall members that each extend toward a radial inner side,
the clutch is disposed in a space surrounded by the two wall members and the rotor holding portion,
the partition member is formed of an annular portion extending in the axial direction and a circular portion in a plate shape extending from one end portion of the annular portion to a radial outer side, and the circular portion is held between the rotor holding portion and one of the two wall members with a snap ring on one side in the axial direction of the rotor holding portion so as to be fixed, and the other end portion of the annular portion is placed in contact with the other wall member, and one of the two wall members includes a hole on a radial outer side of the drum portion.

10. The hybrid drive apparatus according to claim 1, wherein the rotor hub includes a rotor holding portion that holds the rotor, the rotor holding portion includes two wall members that each extend toward a radial inner side, the clutch is disposed in a space surrounded by the two wall members and the rotor holding portion, one of the two wall members is disposed on the speed change mechanism side, transmits power from the motor to the speed change mechanism, and includes a hole on a radial outer side of the drum portion, and the other wall member is disposed on the internal combustion engine side so as to support the rotor via the rotor holding portion.

* * * * *